US008055027B2

(12) United States Patent
Nikiforov

(10) Patent No.: US 8,055,027 B2
(45) Date of Patent: Nov. 8, 2011

(54) GENERATION OF DIRECTIONAL FIELD INFORMATION IN THE CONTEXT OF IMAGE PROCESSING

(75) Inventor: Andrey Nikiforov, Edina, MN (US)

(73) Assignee: Bio-Key International, Inc., Eagan, MN (US)

( * ) Notice: Subject to any disclaimer, the term of this patent is extended or adjusted under 35 U.S.C. 154(b) by 1014 days.

(21) Appl. No.: 10/880,897

(22) Filed: Jun. 30, 2004

(65) Prior Publication Data
US 2006/0002599 A1 Jan. 5, 2006

(51) Int. Cl.
*G06K 9/00* (2006.01)
(52) U.S. Cl. .................................... 382/115; 382/124
(58) Field of Classification Search .................. 382/124, 382/126, 127, 313, 314, 315; 340/5.52, 5.53, 340/5.82, 5.83, 356; 358/496, 497, 486; 250/234
See application file for complete search history.

(56) References Cited

U.S. PATENT DOCUMENTS

| | | | | |
|---|---|---|---|---|
| 4,135,147 A | * | 1/1979 | Riganati et al. | 382/125 |
| 5,631,971 A | * | 5/1997 | Sparrow | 382/125 |
| 5,703,958 A | * | 12/1997 | Hara | 382/124 |
| 5,748,765 A | | 5/1998 | Takhar | 382/124 |
| 5,799,098 A | * | 8/1998 | Ort et al. | 382/125 |
| 5,878,158 A | * | 3/1999 | Ferris et al. | 382/125 |
| 6,002,787 A | * | 12/1999 | Takhar et al. | 382/125 |
| 6,134,340 A | * | 10/2000 | Hsu et al. | 382/124 |
| 6,289,111 B1 | | 9/2001 | Takhar | 382/115 |
| 6,404,904 B1 | * | 6/2002 | Einighammer et al. | 382/124 |
| 6,944,321 B2 | * | 9/2005 | Hamid | 382/124 |
| 2002/0164056 A1 | * | 11/2002 | Funada | 382/124 |

OTHER PUBLICATIONS

J.M. Cross and C.L. Smith, "Thermographic Imagin of the Subcutaneous Vascular Network of the Back of the Hand for Biometric Identification", I.E.E.E. 1995, pp. 20-35.*
Jain, A.; and Hong, L.; and Bolle, R.; "On-Line Fingerprint Verification," Department of Computer Science, Michigan State University and Exploratory Computer Vision Group, IBM T.J. Watson Research Center, Nov. 26, 1996, pp. 1-36.
Cross et al. Thermographic Imaging of the Subcutaneous Vascular Network of the Back of the Hand for Biometric Identification, I.E.E.E. 1995, pp. 20-35.
Notification of Transmittal of the International Search Report and the Written Opinion of the Internal Searching Authority, or the Declaration, Mailed Nov. 30, 2006.

* cited by examiner

*Primary Examiner* — Brian Le
(74) *Attorney, Agent, or Firm* — Westman, Champlin & Kelly, P.A.

(57) ABSTRACT

A computer-implemented method for directionally characterizing an image element within an image is disclosed. The method includes obtaining an image segment and determining a directional representation value that corresponds thereto. The directional representation value is then utilized to directionally identify an image element other than the image segment.

18 Claims, 12 Drawing Sheets

X = VALLEY PIXELS
EMPTY = RIDGE PIXELS
* = STARTING PIXEL

α = angle

GENERATION OF DIRECTIONAL FIELD INFORMATION IN THE CONTEXT OF IMAGE PROCESSING

BACKGROUND OF THE INVENTION

The present invention generally pertains to image processing. More specifically, the present invention relates to methods and procedures for analyzing biometric image information and generating a corresponding directional field estimate.

Image identification systems have been used in the past, one application being biometric image identification systems. One type of biometric image identification system is a fingerprint identification system. In one example of a fingerprint identification system, a user places the tip of a finger on a scanning surface of a fingerprint image reader device. Each ridge of the epidermis (outer skin) is dotted with sweat glands that produce moisture that, in combination with oily secretions and other substances naturally present on the tip of a finger, enable an image of a fingerprint to be scanned. Alternatively, in some instances, images can be generated from readers that do not rely on the moisture content of the skin to capture an image (e.g., some systems simply capture a picture of print ridge characteristics). Regardless of the precise image collection means, collected image information is commonly compared to a database of stored information for verification, authentication, or some other form of analysis.

Security systems that implement fingerprint identification technology have the potential of being reliable and easy to use. These benefits arise from the fact that the technology does not require a system user to retain any piece of knowledge, such as a password, personal identification number, combination or any other code. Neither must a user possess a card, key or any other physical device to gain access to a secured environment. A fingerprint security authentication key, as opposed to a knowledge or possession based security authentication key, is nearly impossible to lose, steal, or be forgotten.

Development of practical security system applications that incorporate fingerprint image identification technology has been hindered by a general non-repeatability of data from one image scan to another. In particular, physical variations present in the environment of a fingerprint reader device can cause substantial incongruities from one image scan of a fingerprint as compared to a subsequently taken image scan of the same fingerprint. Differences in the temperature, amount of pressure applied to the scanning surface, moisture content of the finger, as well as the effects of medications and differences in blood pressure can all contribute to substantial incongruities from one image scan to another. These and other types of inconsistencies have the potential to throw off image analysis and comparison algorithms, which can lead to inaccurate results.

Accordingly, inconsistency has the potential to hinder the development of fingerprint identification technology applications. Inconsistent data can lead to an unacceptably high number of false acceptances (multiple identifications including matching to wrong individuals) and false rejections (not recognizing an enrolled individual). Security applications that require instantaneous and unsupervised comparisons to be made between a scanned fingerprint image and a database of fingerprint images or fingerprint models often have a low tolerance for inconsistency.

A processing component known to be a part of some image data analysis algorithms is the generation of directional field information, which in the context of fingerprint images includes information pertaining to ridge direction. The accuracy of current methods for estimating directional field information is relatively limited. Known methods can be unreliable and not work well in the context of undesirable but common artifacts such as scratches, cuts and wet or dry spots. Because directional field estimation information is commonly utilized as a processing sub-component of an image analysis system, a limited accuracy in the context of a directional field estimate can compromise the accuracy of the overall image analysis process, thereby contributing to inconsistent overall results.

SUMMARY OF THE INVENTION

Embodiments of the present invention pertain to a computer-implemented method for directionally characterizing an image element within an image is disclosed. The method includes obtaining an image segment and determining a directional representation value that corresponds thereto. The directional representation value is then utilized to directionally identify an image element other than the image segment.

DETAILED DESCRIPTION OF ILLUSTRATIVE EMBODIMENTS

I. Illustrative Contextual Environments

Figure 1:
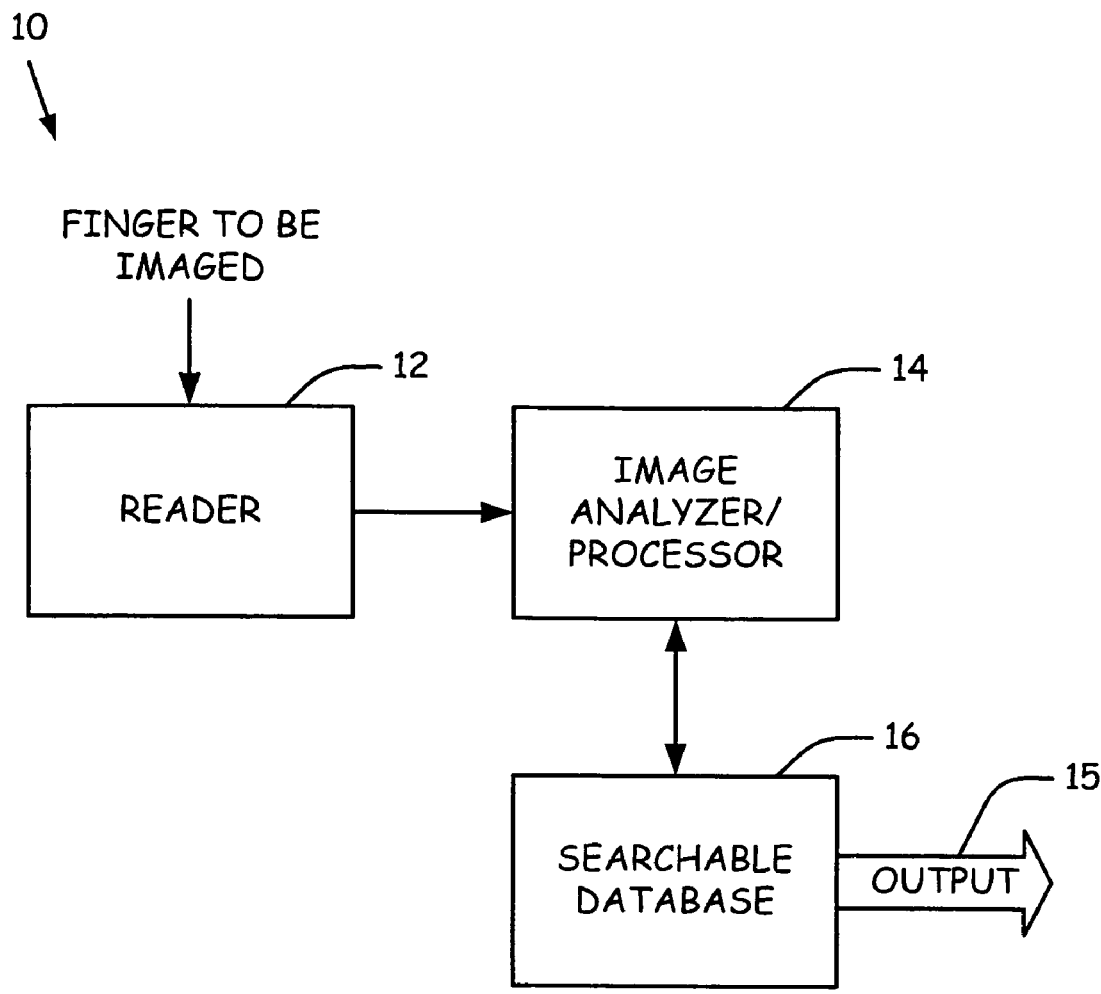
FIG. 1 is a block diagram of a user authentication system.

Various aspects of the present invention pertain to image analysis processes and biometric security systems. The concepts of the present invention can be implemented in conjunction with a broad range of general security applications, including but not limited to physical access security applications, computer network security applications, individual computer security applications, Internet based applications and systems, as well as other security applications. The methods and systems of the present invention are also generally suitable for improving the performance and reliability of image analysis and user authentication systems.

Embodiments of the present invention can be implemented to support systems that restrict access to secure data. Embodiments can also or alternatively be implemented to support systems that enhance security provided in association with a variety of access points. Some of these access points are associated with a physical space, such as a building, a room, a particular airport terminal, an airplane, etc.

In accordance with one embodiment, a biometric scanner is physically positioned within an unsecured area, while access to a separated secured area is denied to anyone who is unable to present authorized biometric information to a biometric scanner for processing by an associated access control program. In accordance with another embodiment, a biometric scanner is physically positioned on an unsecured side of a locked door that remains locked until authorized biometric information is received by a biometric scanner and adequately processed by an associated access control program.

Embodiments of the present invention can also be implemented to support systems that enhance security provided in association with electronic access points. Through interaction with a computing device, a user is able to encounter a wide variety of functional and informational access points or transaction access points, most all of which can potentially be secured with systems that incorporate the methods of the present invention.

A potentially securable electronic access point is encountered when a user is presented with an ability to gain general access to a particular computer network (e.g., a particular LAN, the Internet, etc.). Another potentially securable electronic access point is encountered when a user is presented with an ability to access a particular collection of information (e.g., medical records, account information, personnel information, protected data files, etc.) that is stored on the computing device with which the user is interacting, or is accessibly stored on a remote computing device. Another potentially securable electronic access point is encountered when a user is presented with an ability to access and operate a particular program that is stored on the computing device with which the user is interacting, or is accessibly stored on a remote computing device. Still other potentially securable electronic access points are encountered when a user is presented with an ability to access information stored within a particular file or directory, or an ability to access a class of information that is identified in a particular manner (e.g., confidential), or an ability to utilize functions associated with another independent device (e.g., a particular camera, scanner, cash drawer, vault, etc). These are only a few of many applicable examples of electronic access points.

It should also be noted that embodiments of the present invention are useful in the context of various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

II. Illustrative Operational Environment

FIG. 1 is a block diagram of a user authentication system 10. User authentication system 10 includes a reader portion 12, image analyzer/processor 14 and searchable database 16, which further includes an output 15. Reader portion 12 can be any of a number of known systems capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged. A digitized image of biometric information is produced. The reader commonly uses light or electricity to image the finger's pattern. The digitized image is transferred out of reader portion 12 to image analyzer/processor 14. Image analyzer/processor 14 varies with application, but generally analyzes the image data received for a wide variety of purposes and applications.

Image analyzer/processor 14 is illustratively configured to create an authentication model (a.k.a., image model) based on the particular features and characteristics of images received from reader portion 12. In accordance with one embodiment, authentication models are more than facsimiles of their associated fingerprint images and include a unique range of data elements that provide various analytical opportunities.

In one embodiment, image analyzer/processor 14 directly or indirectly compares data elements of a generated authentication model to data elements of at least one other authentication model stored within searchable database 16. The authentication models stored in database 16 illustratively correspond to previously obtained scanned images, while the authentication model being compared illustratively corresponds to a contemporaneously scanned image. User authentication system 10 is configured to efficiently make a determination as to whether the authentication model corresponding to the contemporaneously scanned fingerprint is substantially similar to any of the authentication models (or directly related data collections) included within the searchable database 16. In this manner, user authentication system 10 provides an efficient and accurate fingerprint image identification system. Such a system is used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which user authentication system 10 is to be applied. For instance, output 15 could be a positive or negative match indication, or an identification indicator of an authentication model or data collection contained in searchable database 16 that substantially matches or corresponds to the image scanned by reader portion 12. These are but several examples of the many potential forms of output 15. In addition, output 15 can include data to be communicated to an application.

III. Operational Overview

Figure 2:
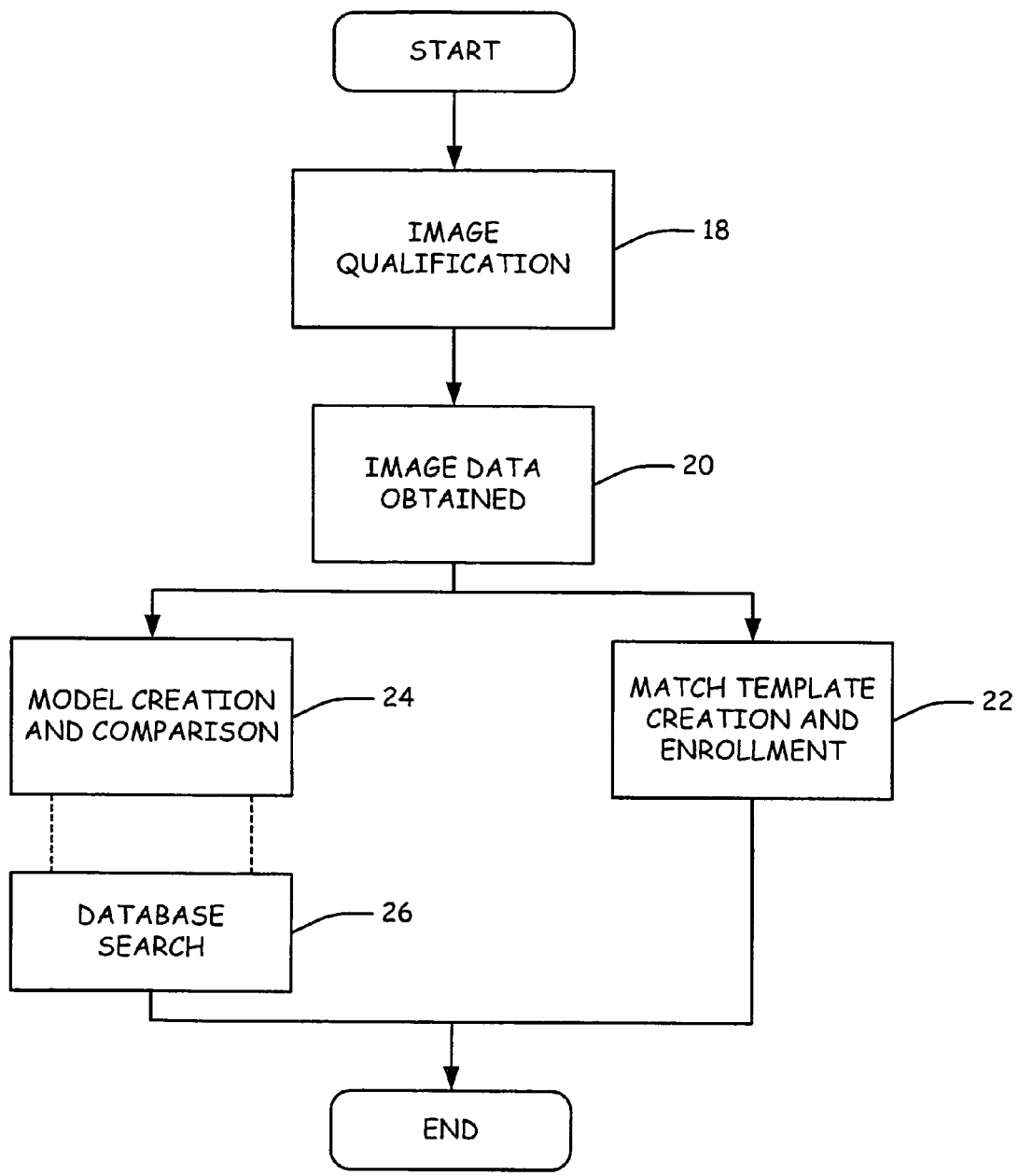
FIG. 2 is a flow diagram illustrating steps associated with analyzing or processing image data.

FIG. 2 is a flow diagram illustrating operations to be carried out within system 10, for example within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions. The image qualification functions are illustratively optional.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

Block 20 in FIG. 2 represents the point at which qualified image data has been obtained. After qualified image data has been obtained, the image data is utilized for at least one of two purposes, namely, enrollment and authentication. Block 22 represents the enrollment process during which match templates are generated (i.e., based on digitized qualified image data) and entered into, and illustratively catalogued within, searchable database 16. Block 24 represents the authentication process that includes comparing data associated with an invocation of biometric data with stored data for the purpose of determining whether access should be granted or denied.

In accordance with one embodiment, data representations generated during processes 22 and 24 are generated in accordance with the same algorithm, or two substantially similar algorithms, such that they are produced in the same, or a substantially similar, format. In accordance with one embodiment; however, substantially different but related algorithms are utilized. Accordingly, the generated data representations are related but not identical. This enables an indirect, relationship-based comparison process during authentication.

As is indicated by block 26 in FIG. 2, a database search 26 can be performed in association with model comparison 24 to determine which, if any, of multiple match templates stored in the searchable database adequately match a data representation generated during the authentication of a "live" invocation. Illustratively, database search 26 is a quick and efficient determination as to which, if any, of potentially thousands, or even millions, of enrollment templates (or data collections related thereto) within database 16 exhibit a desired level of similarity, as compared to a target representation of a "live" invocation. Searching can be done by biometric information alone, or by some identifier like employee ID, User ID, account number, etc. In accordance with one embodiment, an identifier (i.e., an employee ID, User ID, account number, etc.) is utilized to select a single collection of data from database 16 to be compared to a target representation of a "live" invocation on a one-to-one basis.

In accordance with one embodiment, a set of database keys that describe different match template characteristics are defined to facilitate general rather than specific comparisons to be made during the database search 26 process.

IV. Image Analysis/Model Generation

Figure 3:
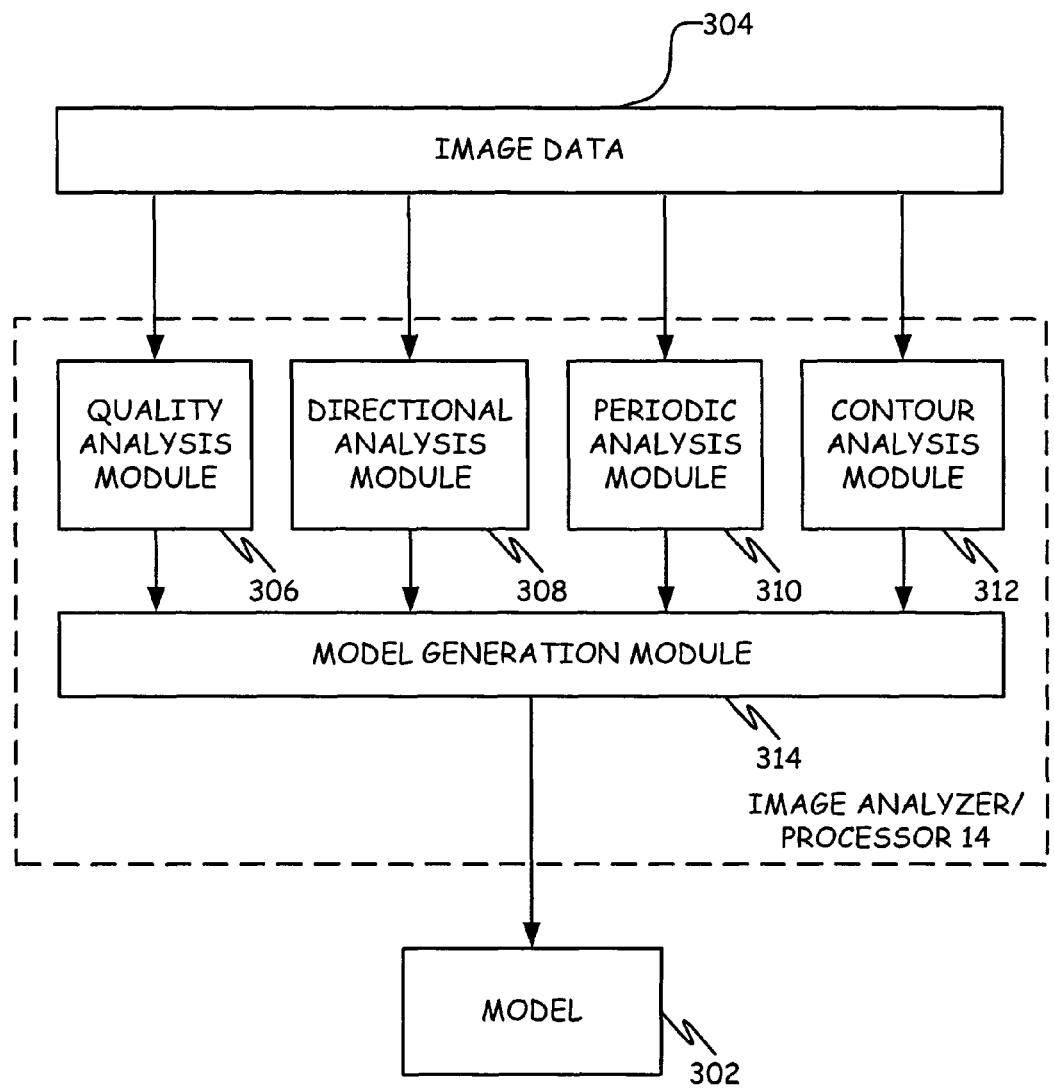
FIG. 3 is a simplified flow diagram illustrating steps associated with generating an image data model.

As was alluded to above, one example of a function performed by image analyzer/processor 14 is generation of a model based on collected image data. FIG. 3 is a simplified process flow diagram illustrating generation of a model 302 that corresponds to received image data 304.

The general concept of generating a model based on collected image data is known in the art. However, there are many different known process for generating a model. In accordance with the process illustrated in FIG. 3, at least four different types of data are generated by four different modules 306-312 and contribute to the process of model creation, which is illustratively carried out by a model generation module 314. In accordance with one embodiment, one or more of the data types generated by modules 306-312 is processed by module 314 in order to create an enhanced or filtered image based on the collected image data 304. The enhanced or filtered image is then processed by module 314 during the generation of the model 302.

As is illustrated, the types of data utilized in the generation of an enhanced image and/or model can include data related to the quality of image data 304. The types of data can also include fingerprint-related data such as the contour or periodic occurrence of ridges and/or valleys. Finally, the types of data can include data related to changes in the direction of image elements. It is to this latter type of data that many of the embodiments of the present invention pertain.

It should be pointed out that FIG. 3 is intended to be but one broad overview of what one model generation processing system might look like. The present invention generally pertains to methods and processes for providing directional analysis information (e.g., information similar to that produced in association with module 308). Without departing from the scope of the present invention, such methods and systems can be incorporated into any image analysis process including but not limited to the process illustrated in FIG. 3.

V. Directional Analysis

Figure 4:
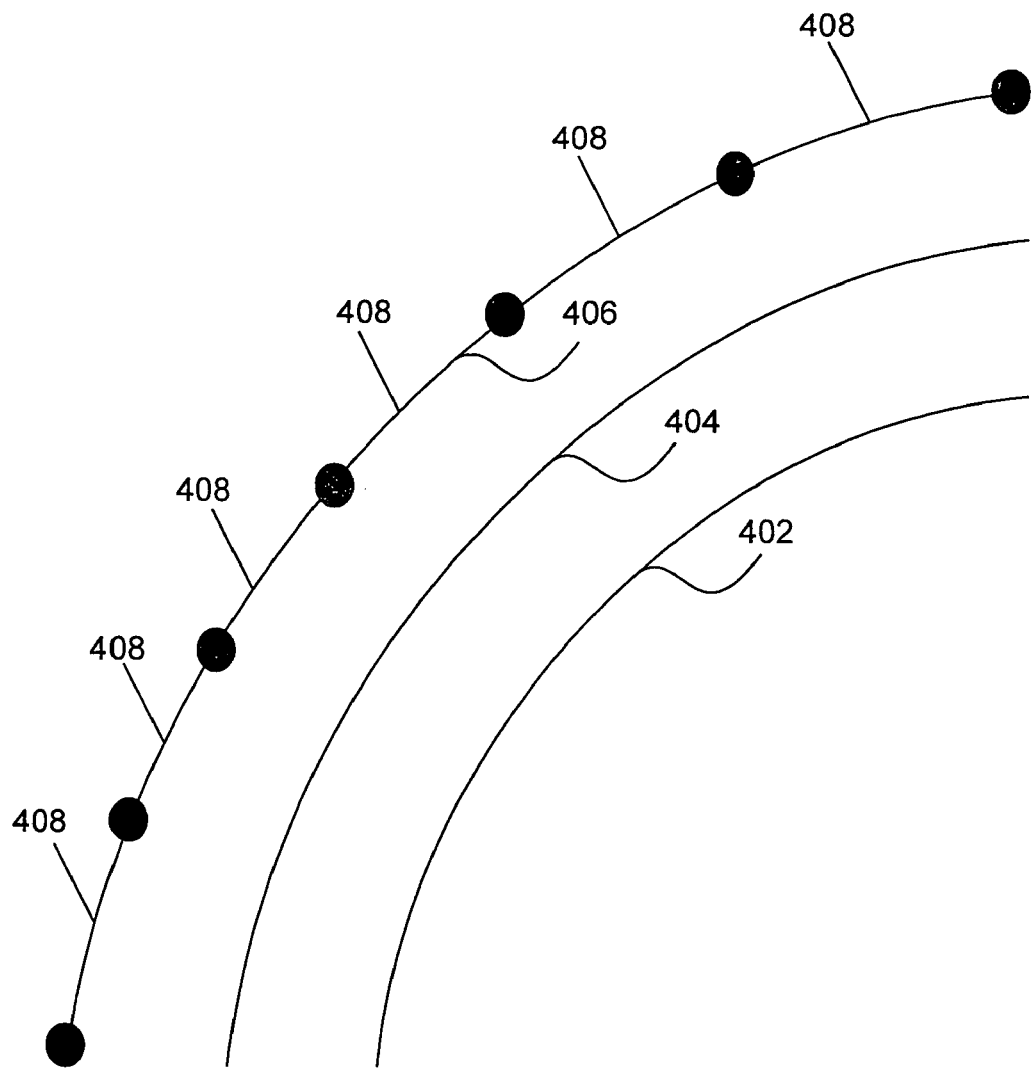
FIG. 4 is a diagrammatic representation of a portion of an image that includes ridge or valley lines.

Various aspects of the present invention pertain to methods for generating directional field information. The methods generally involve a combination of at least two general concepts. The first concept is the process of generating line segments that correspond to, in the case of fingerprint analysis, a ridge line or a valley line. FIG. 4 is a diagrammatic representation of a portion of an image that includes ridge or valley lines 402, 404 and 406. Line 406 has been divided into a plurality of segments 408. It should be noted that the present invention is not limited to print image analysis. Segmentation processes can be similarly executed on images other than print images, just as the embodiments of the present invention can be applied to images other than print images.

The other general concept that contributes to the methods of the present invention is the notion of determining a direction of a field within an image. This process involves analyzing image components and assigning corresponding directional values within a range of zero and a full rotation. It should be noted that the concept of a full rotation has been represented in a variety of different ways. For example, a full rotation can be provided with notation such as $2\pi$ rad. or $360°$, with partial rotations being related portions thereof. However, when providing notation for directional field values, a full rotation can be divided into any number of sub-components such as 128, 16, 8, 4, etc. The particular rotational notation used will depend at least on a system's particular tolerance for inaccuracy. For many applications, 50 to 100 divisions for a full rotation will be sufficiently accurate. In addition, notation that involves higher numbers of divisions for a full rotation tends to require a relatively large investment of processing and memory resources in a computer context. However, modern computers are typically equipped with enough resources to store even full rotation divisions of up to 1,000 or even greater.

In accordance with one aspect of the present invention, directional field estimations are provided on a segment-based level. This stands in contrast to other known systems wherein such information is provided on a higher, often much more estimated level. Regardless of the underlying basis, directional field estimations are commonly delineated in terms of orientation and/or direction. There are established representation conventions for both orientation and direction. It is common for directional field estimations to be represented relative to a full rotation. Accordingly, it should be understood that the present invention could be applied in the context of the creation of directional information (0 . . . 360) or orientation information (0 . . . 180). To the extent that the term "directional field" is utilized within the present description, it should be understood that ranges of both 180 and 360 are actually contemplated as being within the scope of the present invention. The actual applicable range is likely to be application specific.

Figure 5:
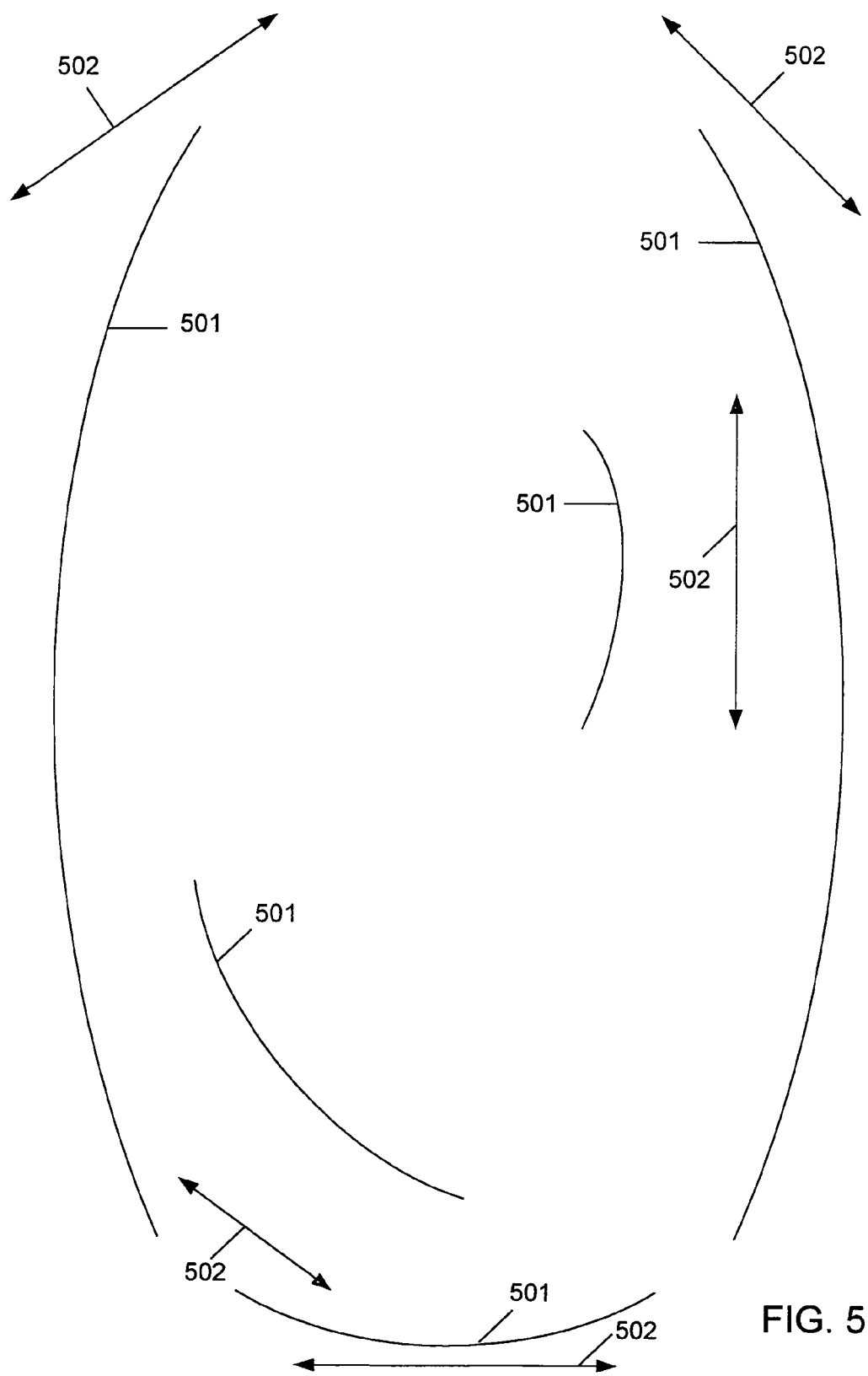
FIG. 5 is a diagrammatic representation of a print image, wherein the representation includes a graphical representation of direction.

FIG. 5 is a diagrammatic representation of a print image. The image includes ridge or valley lines 501. Within FIG. 5, graphical representations 502 provide a rough idea of how direction presents itself within a print image.

In accordance with one aspect of the present invention, the process of generating a directional field estimation begins with analyzing an image and performing a segmentation procedure. Any known segmentation process could be utilized. In accordance with one embodiment, direct gray scale ridge following is carried out in order to segment a component of the image. This is but one form of segmentation within the scope of the present invention. It should be noted that processes for segmentation are generally known in the art for many purposes such as generating minutiae data points. However, segmentation has not been utilized as a basis for generating directional field estimations.

Figure 6:
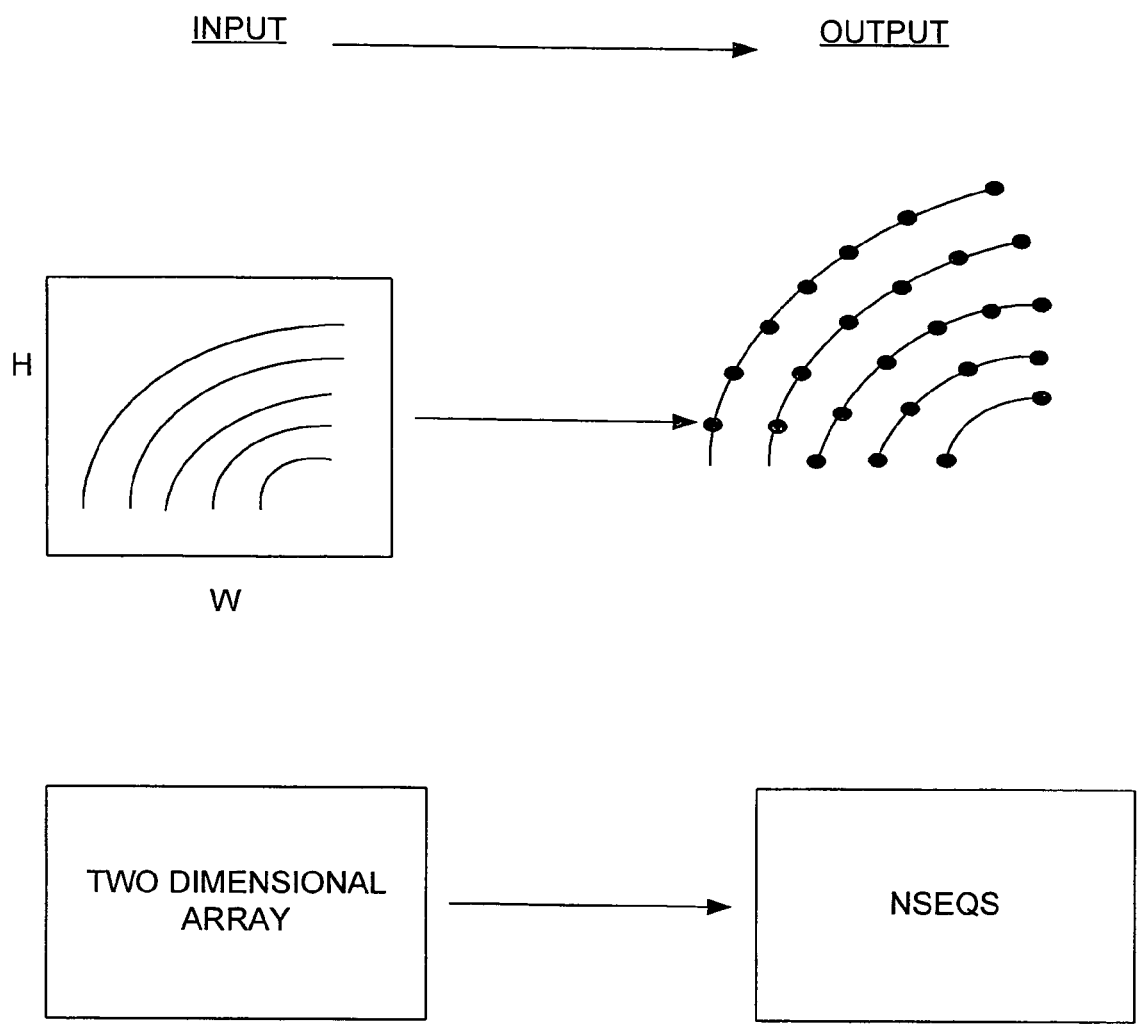
FIG. 6 is a schematic representation of a segmentation process.

In accordance with the one aspect of the present invention, FIG. 6 is a schematic representation of a segmentation process. In accordance with one embodiment, the segmentation procedure breaks an image into N number of segment sequences (the image is illustratively a collection of gray scale values from 0 through 255). The input is illustratively a two-dimensional array, while the output is illustratively N number of sequences, wherein each sequence is a set of segments.

Figure 7:
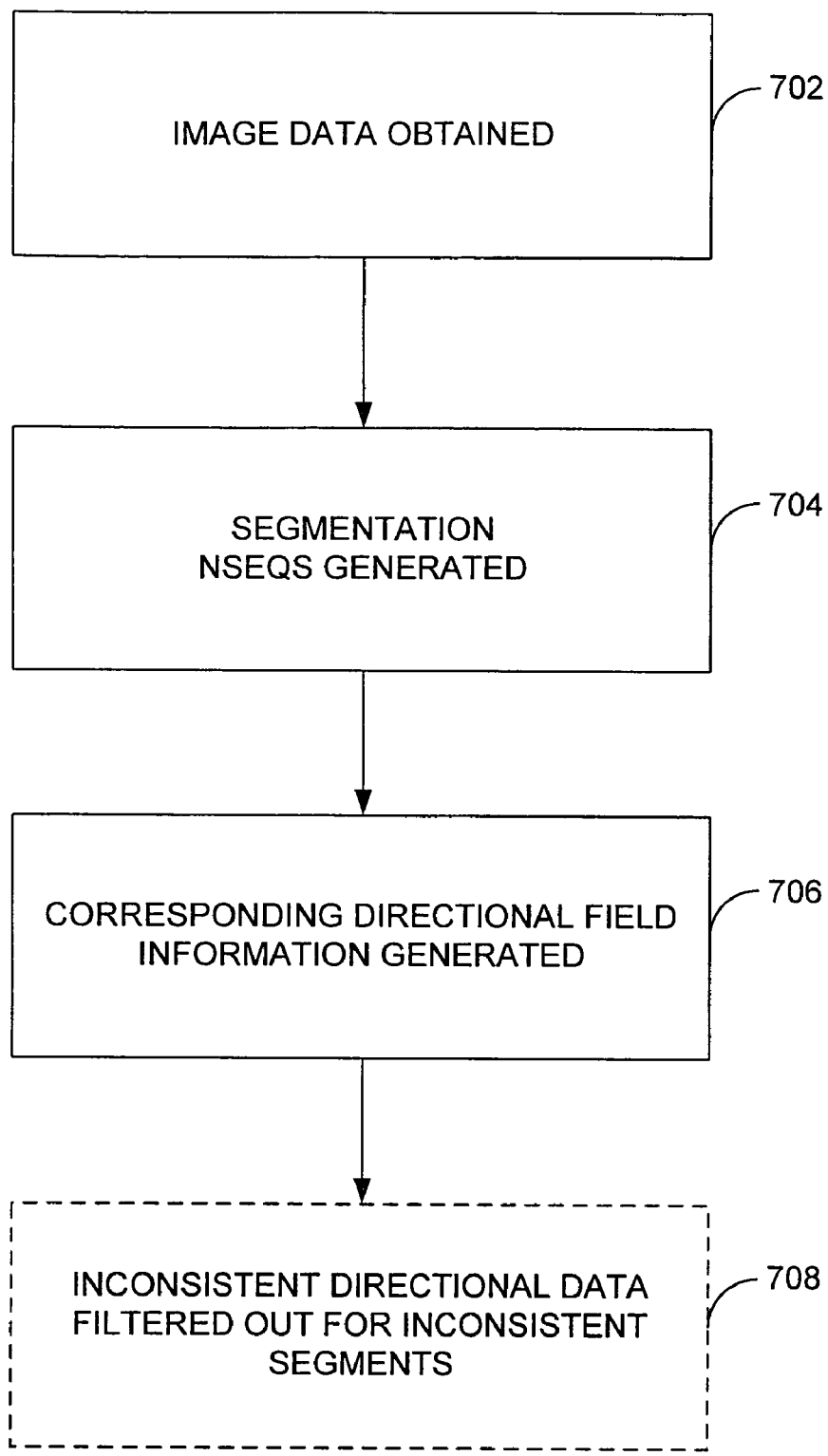
FIG. 7 is a flow diagram illustrating steps associated with generating segment-based directional field information.

FIG. 7 is a flow diagram illustrating steps associated with embodiments of the present invention. Block 702 represents a step wherein image data is obtained. In accordance with block 704, N number of segmentation sequences are generated based on the obtained image data. Such segmentation can be carried out with any method, such as those already known in the art for generating minutiae data points. In accordance with one aspect of the present invention, such segmentation data is utilized, as is represented by block 706, as the basis for generation of directional field estimations.

The described procedures for determining directional field estimations are different than known procedures for determining directional field values. In many known systems, a coordinate grid is essentially dropped over an image during the process of assigning directional values. For example, it is common for image data to be divided into boxed sections (e.g., 10 pixel by 10 pixel boxes). A collective overall direction is then assigned to the components within each box. The result is commonly a directional field estimate that simply comprises a grid with a limited number of directional values (i.e., one for each box). Such directional values are relatively crude in their estimation of direction. The generation of directional field information based on segmentation as described in the context of the present invention enables a more accurate resource.

There are many advantages associated with the described segment-based derivation of directional field information as compared to other known methods for generating similar values. For example, if an image data set includes a distortion (e.g., a skinfold or cut in a fingerprint image), this can throw off a grid-based system that estimates direction within a box. The distortion, which can have a direction that is askew to (even perpendicular to) the reality of the image data, is commonly calculated into the estimation process. This leads to relatively inaccurate results because inaccurate directional information attributed to a distortion can easily throw off the direction for a given grid box.

When directional field values are collected on a segment-by-segment basis in accordance with the present invention, it does not require a great deal of analysis to identify and discount distortion. For example, if three consecutive segments are generally oriented in the same direction and a fourth consecutive segment is in a generally perpendicular direction, then there is a reasonable possibility that the fourth segment is attributable to a distortion and therefore can be discounted, particularly if a fifth consecutive segment is consistent with the first three. In accordance with one aspect of the present invention, an algorithm is applied to search for directional inconsistencies and discount inconsistent segment directional field information as necessary. Accordingly, restrictions on inconsistent ridge behavior can be implemented easily when direction is calculated in accordance with embodiments of the present invention. Accordingly, the embodiments of the present invention work particularly well in the context of analysis on poor quality images. Within FIG. 7, a block 708 has been included to represent an optional step of filtering out inconsistent directional data for inconsistent segments.

Processes for generating directional field information based on segmentation data will now be described in greater detail. While the embodiment will be described in the context of print image analysis, it should continue to be assumed that similar processes could be adapted for different kinds of image data. Also, it should be noted that any known method for assigning direction to a segment can be utilized to generate directional field estimations in accordance with the present invention. Some known methods are specific to print objects in that they are derived based on the inherent nature of a print object.

Figure 8:
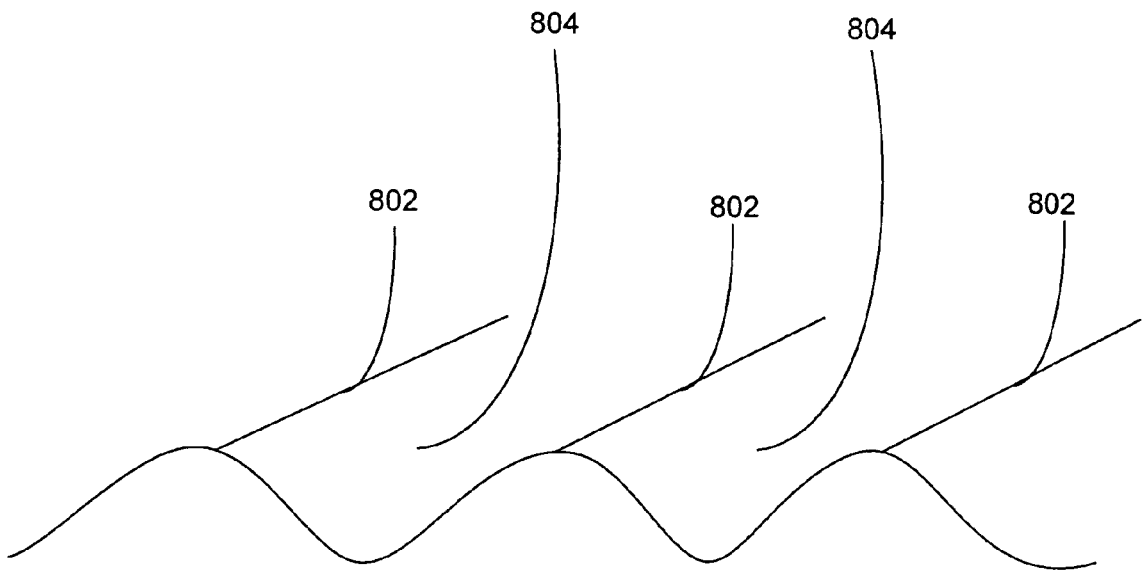
FIG. 8 is a perspective diagrammatic view of an enlarged portion of a fingerprint.
Figure 9:
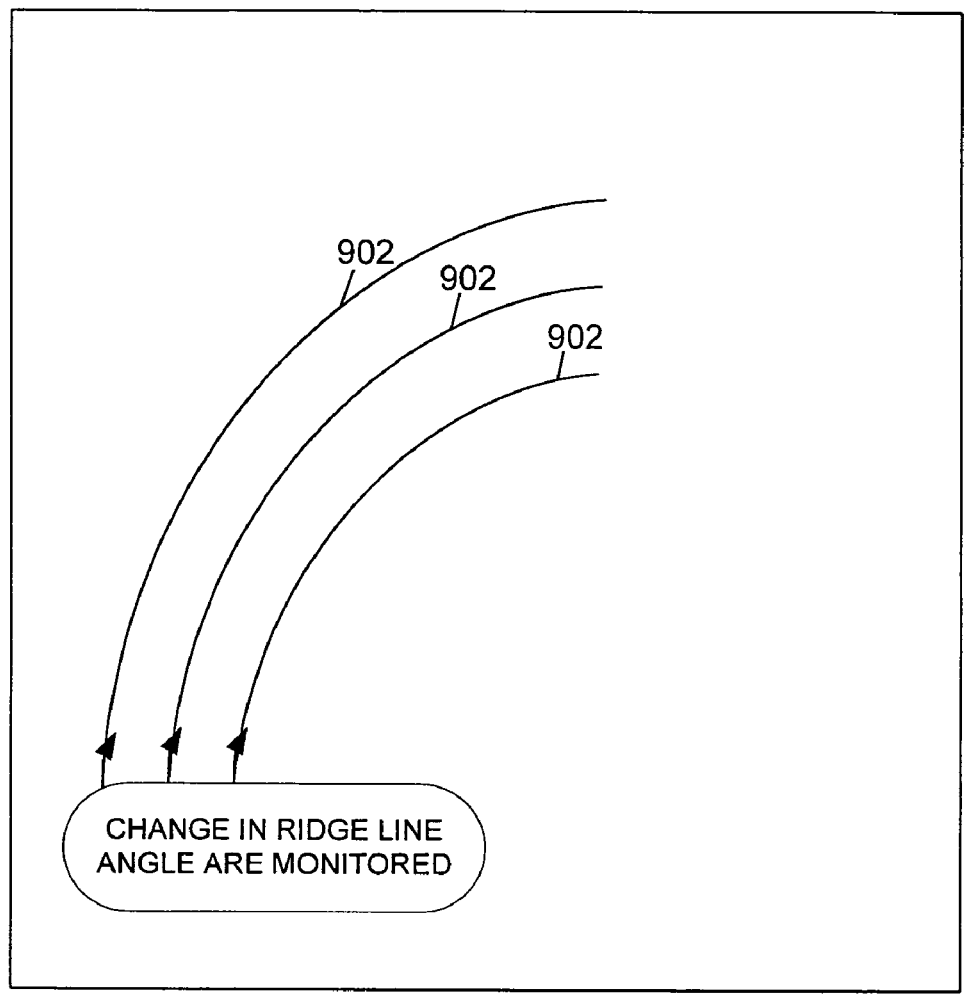
FIG. 9 is a diagrammatic view of image data that corresponds to the fingerprint portion illustrated in FIG. 8.

FIG. 8 is a perspective diagrammatic view of an enlarged portion of a fingerprint. The fingerprint includes ridges 802 and valleys 804. FIG. 9 is a diagrammatic view of image data that illustratively corresponds to the print illustrated in FIG. 8. The image data in FIG. 9 includes ridge lines 902 that correspond to ridges 802. There are methods known in the art for determining the direction of ridge lines 902. In accordance with some of these methods, collections of consecutive pixels along ridge lines 902 are analyzed and statistical averaging is performed in order to monitor angle changes along a ridge line. Such information pertaining to angles have been used to assist in the definition of minutiae data points but has not been utilized to generate directional field estimations, which are utilized for many purposes other than defining minutiae data points. In accordance with one aspect of the present invention, segmentation is performed to divide the ridge line into segments, and angular determination algorithms similar to those previously used to monitor ridge line angle changes are executed on the various segments in order to generate a directional field estimation that is specific to the various segments.

In accordance with one aspect of the present invention, a generated directional field estimation includes a catalog of ridge segments listed with corresponding directional information. Accordingly, the generated directional field estimation provides directional information on a ridge-specific basis. In accordance with one embodiment, however, a visual representation of such directional field information can be generated (e.g., ridge angles are color coded, represented by arrows, etc.).

Figure 10:
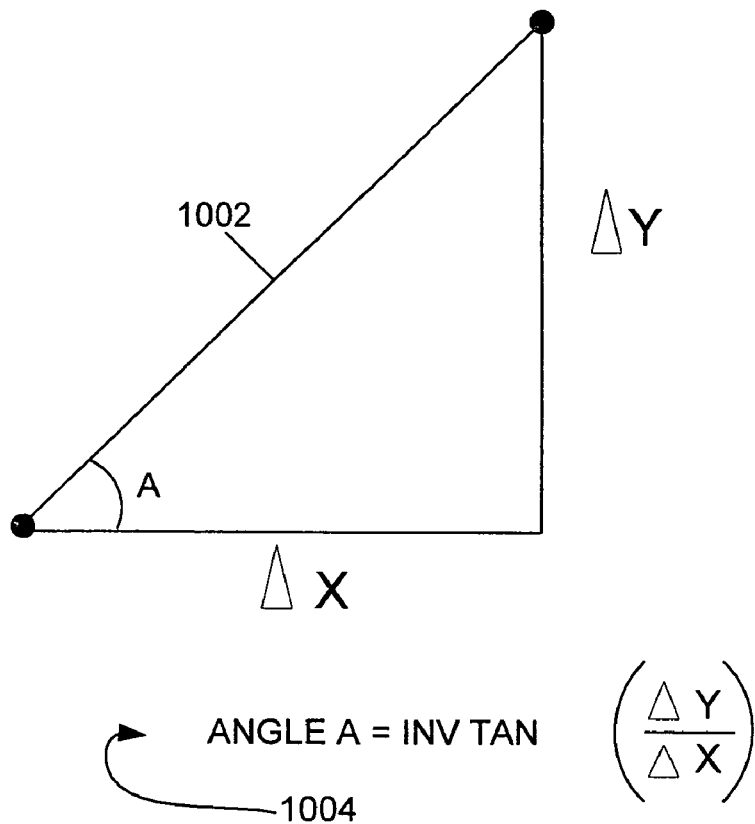
FIG. 10 is a blown up view of a segment.

After segmentation has occurred and a segment has been identified, even simple geometric principles can be applied to assign an angle to a segment. FIG. 10 is a blown up view of a segment 1002. As is known to be an established principle of geometry, and is indicated in FIG. 10, angle A is equal to the inverse tangent of the length of Y divided by the length of X. This process can be carried out to define angles for all ridge segments thereby enabling a segment-based directional field estimations.

The relative advantages associated with a segment-based directional field estimation become even more apparent when consideration is given to typical purposes for which directional field estimations are utilized within image processing. One purpose for which directional field estimations can be applied is to assign angle values to minutiae elements. For example, it is common that a minutiae point located on a ridge line can be identified with the angle of the ridge line at its coordinate location. Accordingly, once the coordinates of a minutiae point have been assigned, the corresponding directional field estimation can be referenced to provide an angle for the minutiae point. A directional field estimation generated in accordance with the segment-based embodiments of the present invention will generally provide a direction value that is particularly accurate for the minutiae point. A minutiae point with corresponding angle is a data element that can be utilized, for example, in a compare process. In essence, the directional field is used as a reference table to assign angles to minutiae data points.

Another image processing purpose for which a directional field estimations are commonly utilized is image enhancement. It is common for an image to be corrupt or unsmooth along ridge lines. It is also common for there to be variations in density along ridge lines. Smoothing is a common technique for providing a remedy for density variations, gaps and other inconsistencies. There are many different smoothing techniques. Some smoothing techniques are non-directional (e.g., isotropic smoothing filters). Other smoothing techniques incorporate reliance on directional field information. Directional smoothing (e.g., anisotropic smoothing filters) will do more than simply average pixel values to eliminate inconsistencies. Such techniques are also known as adaptive smoothing techniques. Directional smoothing algorithms will adapt to directional characteristics of image data within an inconsistent area. Segment-based directional field information produced in accordance with embodiments of the present invention adds information to the directional smoothing process that is relatively accurate and tailored closely to a pixel location. For example, pixel averaging can be limited to ridge characteristics in the immediate vicinity that are directionally consistent.

Only a couple of many examples of applications of directional field information within image processing have been provided. However, it should be understood that directional field information is valuable for many other aspects of imaging processing. Because the segment-based embodiments of the present invention provide more accurate or closely tailored direction information, the embodiments will enable improvements in any image processing method that incorporates directional field estimations.

Accordingly, the present invention pertains to a computer-implemented method for directionally characterizing an image element. An image segment (a ridge segment or a valley segment) is obtained and a directional representation value is assigned thereto. The directional representation value is utilized to directionally identify an image element other than the image segment itself. For example, the directional representation value can be utilized to directionally identify a minutiae value such as a rod ending, an island, a bifurcation, a cross-over, etc. Alternatively, the directional representation value can be utilized to directionally identify a core (or delta) portion of an image, or to identify a distinguishing mark within an image such as a scar or blemish (e.g., a mole or a wart). Alternatively, as is known in the art directional information can be utilized to directionally identify a portion of the image such as a region of pixels. The directional representation value can be utilized for this purpose as well. The value can also be utilized to directionally identify a pixel within the image including a pixel other than a pixel located on an image segment directly associated with the value.

In accordance with one aspect of the present invention, directional representation values can be utilized as a basis for image enhancement. In other words, based on the values, inconsistencies can be corrected in a manner known in the art wherein directional field information otherwise derived has been used for such purpose. The directional representation values enable more detailed and corrections closer in proximity to an inconsistency. Inconsistencies that can be remedied in accordance with the present invention include, but are not limited to, distortions, gaps, smears and the like.

Figure 11:
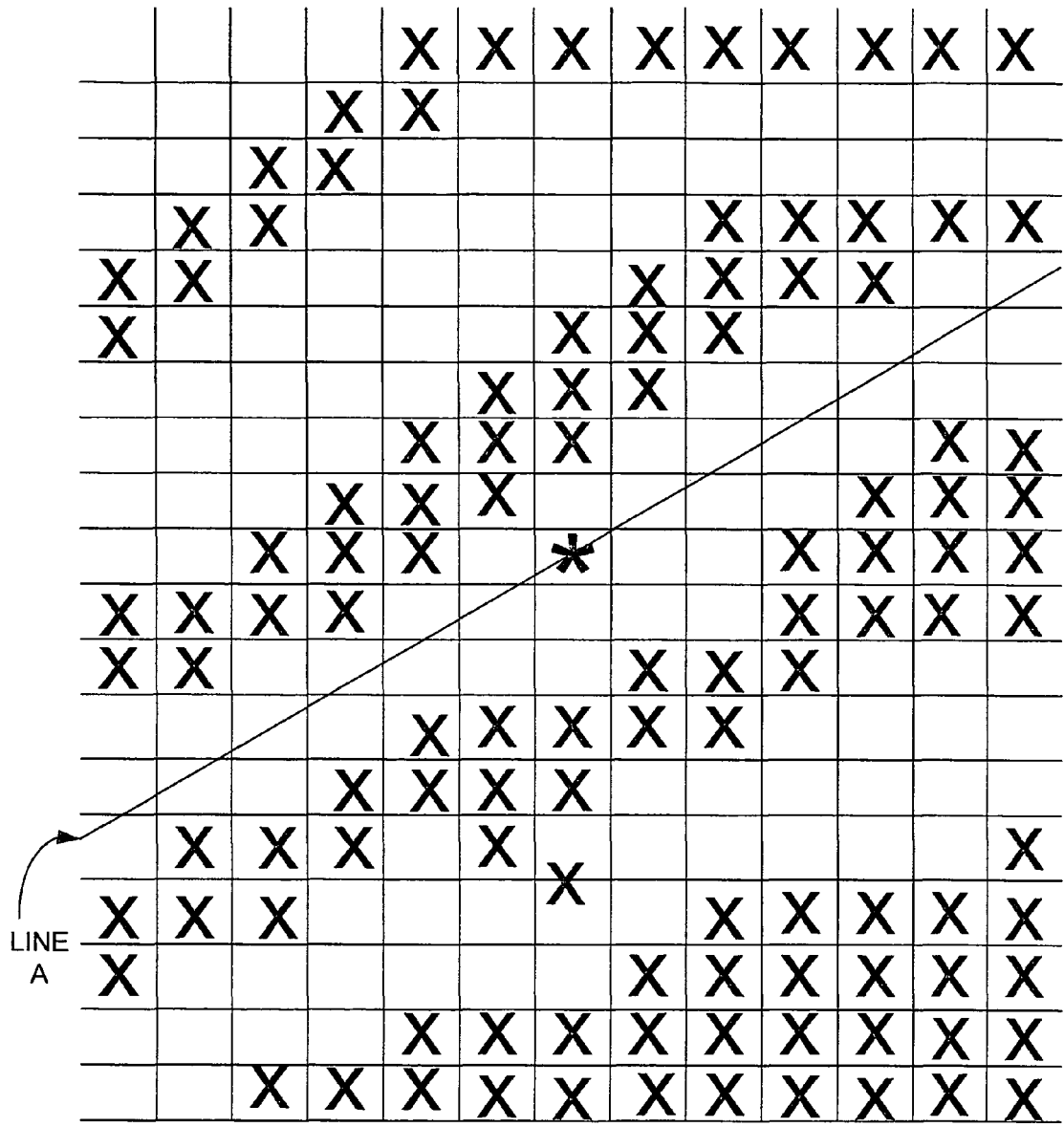
FIG. 11 is a schematic representation of a fragment of an image.

In accordance with one embodiment, generation of a directional field (could just as easily be an orientation field) will now be described. FIG. 11 is a schematic representation of a portion of an image grid. A rectangular box illustratively corresponds to an individual image pixel. Boxes with X's indicate valley pixels and empty boxes indicate ridge line pixels. An algorithm for generating a segment illustratively starts with selection of an arbitrary starting ridge pixel indicated in FIG. 11 by a star. In accordance with one embodiment, the intensity of ridge pixels is determinable and a selected starting pixel has an intensity greater than a predetermined threshold intensity. Starting pixels are illustratively distributed over the entire image, not just the illustrated image fragment shown in FIG. 11 (e.g., distributed relatively uniformly). A neighborhood of ridge pixels are constructed around each starting pixel (e.g., a set of n pixels wherein n can be selected as desired for a particular application). Each point is used in least squares (LS) estimation of the parameters of the line A. In other words, a line (y=ax+b) that corresponds to the starting point is constructed.

Figures 12, 13, 14:
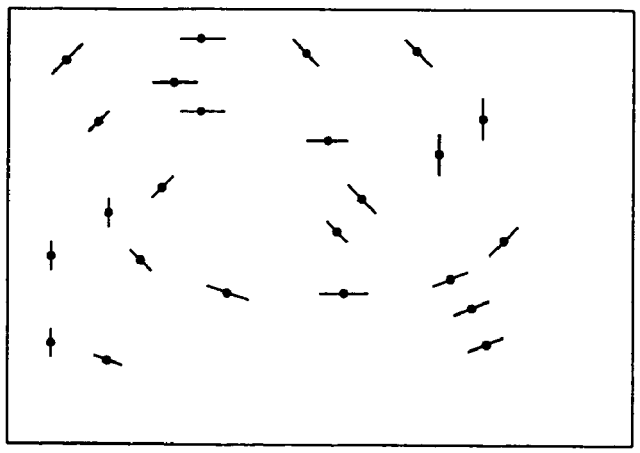
FIG. 12 is a schematic representation of line estimations associated with an overall image.
FIG. 13 is a schematic representation of a directional field representation.
FIG. 14 is a schematic representation of a directional field representation following smoothing or averaging.

FIG. 12 is a schematic representation of a plurality of estimated lines for the plurality of start points. Each line estimate provides direction estimate at the starting points, for example, α=angl=arctg(a). FIG. 13 is a schematic representation demonstrating direction values inserted into the image for each line estimation. In accordance with one embodiment, the direction values are average (e.g., smoothed). FIG. 14 is a schematic representation of a final directional field following a smoothing or averaging. Of course, the directional field can be represented as a data table or in any other desirable form appropriate for subsequent processing.

Although the present invention has been described with reference to preferred embodiments, workers skilled in the art will recognize that changes may be made in form and detail without departing from the spirit and scope of the invention.

What is claimed is:

1. A method of enhancing an image, comprising:
   obtaining an image segment;
   determining a directional representation value that corresponds to the image segment;
   using a computer processor that is a component of the computer to utilize the directional representation value to directionally identify an image element other than the image segment;
   identifying an inconsistency within the image; and
   correcting the inconsistency based at least in part on the directional representation value, wherein correcting the inconsistency comprises correcting a distortion.

2. A method of enhancing an image, comprising:
obtaining an image segment;
determining a directional representation value that corresponds to the image segment;
using a computer processor that is a component of the computer to utilize the directional representation value to directionally identify an image element other than the image segment;
identifying an inconsistency within the image; and
correcting the inconsistency based at least in part on the directional representation value, wherein correcting the inconsistency comprises conforming to directional characteristics of image data proximate the inconsistency as indicated at least in part by the directional representation value.

3. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein obtaining an image segment comprises obtaining a valley segment.

4. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify an image element comprises utilizing the directional representation value to directionally identify a minutiae element.

5. The method of claim 4, wherein utilizing the directional representation value to directionally identify a minutiae element comprises utilizing the directional representation value to directionally identify a rod ending.

6. The method of claim 4, wherein utilizing the directional representation value to directionally identify a minutiae element comprises utilizing the directional representation value to directionally identify an island.

7. The method of claim 4, wherein utilizing the directional representation value to directionally identify a minutiae element comprises utilizing the directional representation value to directionally identify a bifurcation.

8. The method of claim 4, wherein utilizing the directional representation value to directionally identify a minutiae element comprises utilizing the directional representation value to directionally identify a cross-over.

9. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify and image element comprises utilizing the directional representation value to directionally identify a core portion of an image.

10. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify and image element comprises utilizing the directional representation value to directionally identify a delta portion of an image.

11. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify an image element comprises utilizing the directional representation value to directionally identify a distinguishing mark within an image, and wherein utilizing the directional representation value to directionally identify an image element comprises utilizing the directional representation value to directionally identify a scar within an image.

12. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify an image element comprises utilizing the directional representation value to directionally identify a distinguishing mark within an image, and wherein utilizing the directional representation value to directionally identify an image element comprises utilizing the directional representation value to directionally identify a blemish within an image.

13. A computer-implemented method for directionally characterizing an image element within an image, the method comprising:
obtaining an image segment;
determining a directional representation value that corresponds to the image segment; and
using a computer processor that is a component of the computer to utilize the directional representation value to directionally identify an image element other than the image segment, wherein utilizing the directional representation value to directionally identify an image element comprises utilizing the directional representation value to directionally identify a distinguishing mark within an image, and wherein utilizing the directional representation value to directionally identify an image element comprises utilizing the directional representation value to directionally identify a mole within an image.

14. A computer-implemented method for directionally characterizing an image element within an image, the method comprising:

obtaining an image segment;

determining a directional representation value that corresponds to the image segment; and using a computer processor that is a component of the computer to utilize the directional representation value to directionally identify an image element other than the image segment, wherein utilizing the directional representation value to directionally identify an image element comprises utilizing the directional representation value to directionally identify a distinguishing mark within an image, and wherein utilizing the directional representation value to directionally identify an image element comprises utilizing the directional representation value to directionally identify a wart within an image.

15. A computer-implemented method for directionally characterizing an image element within an image, the method comprising:

obtaining an image segment;

determining a directional representation value that corresponds to the image segment; and using a computer processor that is a component of the computer to utilize the directional representation value to directionally identify an image element other than the image segment, wherein utilizing the directional representation value to directionally identify and image element comprises utilizing the directional representation value to directionally identify a portion of the image.

16. The method of claim 15, wherein utilizing the directional representation value to directionally identify and image element comprises utilizing the directional representation value to directionally identify a pixel within the image.

17. The method of claim 15, wherein utilizing the directional representation value to directionally identify and image element comprises utilizing the directional representation value to directionally identify a pixel other than a pixel located on the image segment.

18. The method of claim 15, wherein utilizing the directional representation value to directionally identify and image element comprises utilizing the directional representation value to directionally identify a region of pixels within the image.

* * * * *